US011849168B2

(12) United States Patent
Marti et al.

(10) Patent No.: US 11,849,168 B2
(45) Date of Patent: Dec. 19, 2023

(54) METHODS AND SYSTEMS FOR RECORDING TRANSMITTED DATA

(71) Applicant: InterDigital CE Patent Holdings, SAS, Issy-les-Moulineaux (FR)

(72) Inventors: Urs-Viktor Marti, Münchenbuchsee (CH); Dario Vieceli, Oberengstringen (CH)

(73) Assignee: InterDigital CE Patent Holdings, SAS, Paris (FR)

( * ) Notice: Subject to any disclaimer, the term of this patent is extended or adjusted under 35 U.S.C. 154(b) by 51 days.

(21) Appl. No.: 16/922,142

(22) Filed: Jul. 7, 2020

(65) Prior Publication Data
US 2020/0336779 A1 Oct. 22, 2020

Related U.S. Application Data

(63) Continuation of application No. 14/590,837, filed on Jan. 6, 2015, now Pat. No. 10,708,644.

(30) Foreign Application Priority Data

Jan. 6, 2014 (EP) .................................... 14150253

(51) Int. Cl.
*H04N 21/2747* (2011.01)
*H04N 5/765* (2006.01)
(Continued)

(52) U.S. Cl.
CPC ......... *H04N 21/2747* (2013.01); *H04N 5/765* (2013.01); *H04N 21/4147* (2013.01);
(Continued)

(58) Field of Classification Search
CPC ............... H04N 21/2747; H04N 5/765; H04N 21/4147; H04N 21/47202; H04N 21/47208; H04N 21/6379; H04N 21/6405
See application file for complete search history.

(56) References Cited

U.S. PATENT DOCUMENTS

2005/0022242 A1  1/2005  Rosetti et al.
2005/0283810 A1  12/2005  Elliset et al.
(Continued)

FOREIGN PATENT DOCUMENTS

WO    20070136399    11/2007

OTHER PUBLICATIONS

European Search Report for EP14150253.4, dated Jun. 30, 2014, 1 page.

(Continued)

*Primary Examiner* — Mishawn N. Hunter
(74) *Attorney, Agent, or Firm* — Jerome G. Schaefer

(57) ABSTRACT

Methods and systems are provided for recording data in a network. A recording device may receive a recording instruction identifying a media content transmitted by an upstream media content server, and may offload recording one or more of a plurality of portions of the media content to one or more intermediate recording devices positioned between the recording device and the upstream media content server. Each portion of the media content may correspond to different portion of a transmission period associated with transmission of the media content, and may be assigned a corresponding recording control information configured based, at least in part, on one or more parameters associated with a network node recording or storing a corresponding one of the portions. Storage and retrieval of each of the portions of the media content may be managed based, at least in part, on the corresponding recording control information.

19 Claims, 7 Drawing Sheets

(51) Int. Cl.
   *H04N 21/6379* (2011.01)
   *H04N 21/472* (2011.01)
   *H04N 21/6405* (2011.01)
   *H04N 21/4147* (2011.01)

(52) U.S. Cl.
   CPC . *H04N 21/47202* (2013.01); *H04N 21/47208* (2013.01); *H04N 21/6379* (2013.01); *H04N 21/6405* (2013.01)

(56) References Cited

U.S. PATENT DOCUMENTS

| | | |
|---|---|---|
| 2007/0143809 A1 | 6/2007 | Chen et al. |
| 2008/0112686 A1 | 5/2008 | Chen et al. |
| 2010/0115121 A1 | 5/2010 | Roos et al. |
| 2010/0115575 A1 | 5/2010 | Yu et al. |
| 2010/0218223 A1 | 8/2010 | Simpson et al. |
| 2010/0332560 A1 | 12/2010 | Gerbasi, III |
| 2012/0131622 A1 | 5/2012 | McDysan et al. |
| 2012/0210382 A1 | 8/2012 | Walker et al. |
| 2013/0152139 A1 | 6/2013 | Davis et al. |
| 2014/0153907 A1 | 6/2014 | Farah |
| 2014/0199051 A1 | 7/2014 | Engeli et al. |
| 2014/0237522 A1 | 8/2014 | Rothschild et al. |
| 2014/0380379 A1 | 12/2014 | Klappert et al. |
| 2015/0123794 A1 | 5/2015 | Hämäläinen et al. |

OTHER PUBLICATIONS

European Communication for EP14150253.4, dated Feb. 12, 2021, 4 pages.

METHODS AND SYSTEMS FOR RECORDING TRANSMITTED DATA

CLAIM OF PRIORITY

This patent application is a continuation of U.S. patent application Ser. No. 14/590,837, filed Jan. 6, 2015 (now issued U.S. Pat. No. 10,708,644), which pursuant to 35 U.S.C. § 119 claims the filing date benefit of and right of priority to European (EP) Patent Application No. 14150253.4, filed Jan. 6, 2014. Each of the above applications is hereby incorporated herein by reference in its entirety.

FIELD

The present disclosure relates to communication systems and solutions, particularly recording of media content transmitted over networks. In particular, but not exclusively, various implementations in accordance with the present disclosure relate to one-to-many transmission of data over a network (e.g., multicasting), in which end-user devices may be configured to record a multicast item for future playback.

BACKGROUND

Existing methods and systems for handling (e.g., recording and subsequently data) data communicated over networks may be costly, cumbersome, and inefficient. Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A system and/or method is provided for methods and systems for recording transmitted data, substantially as shown in and/or described in connection with at least one of the figures, as set forth more completely in the claims.

These and other advantages, aspects and novel features of the present invention, as well as details of illustrated implementations thereof, will be more fully understood from the following description and drawings.

BRIEF DESCRIPTION OF THE DRAWINGS

Various features and advantages of the disclosure will become apparent from the following description of non-limiting exemplary implementations, with reference to the appended drawings, in which.

DETAILED DESCRIPTION

Figure 1:
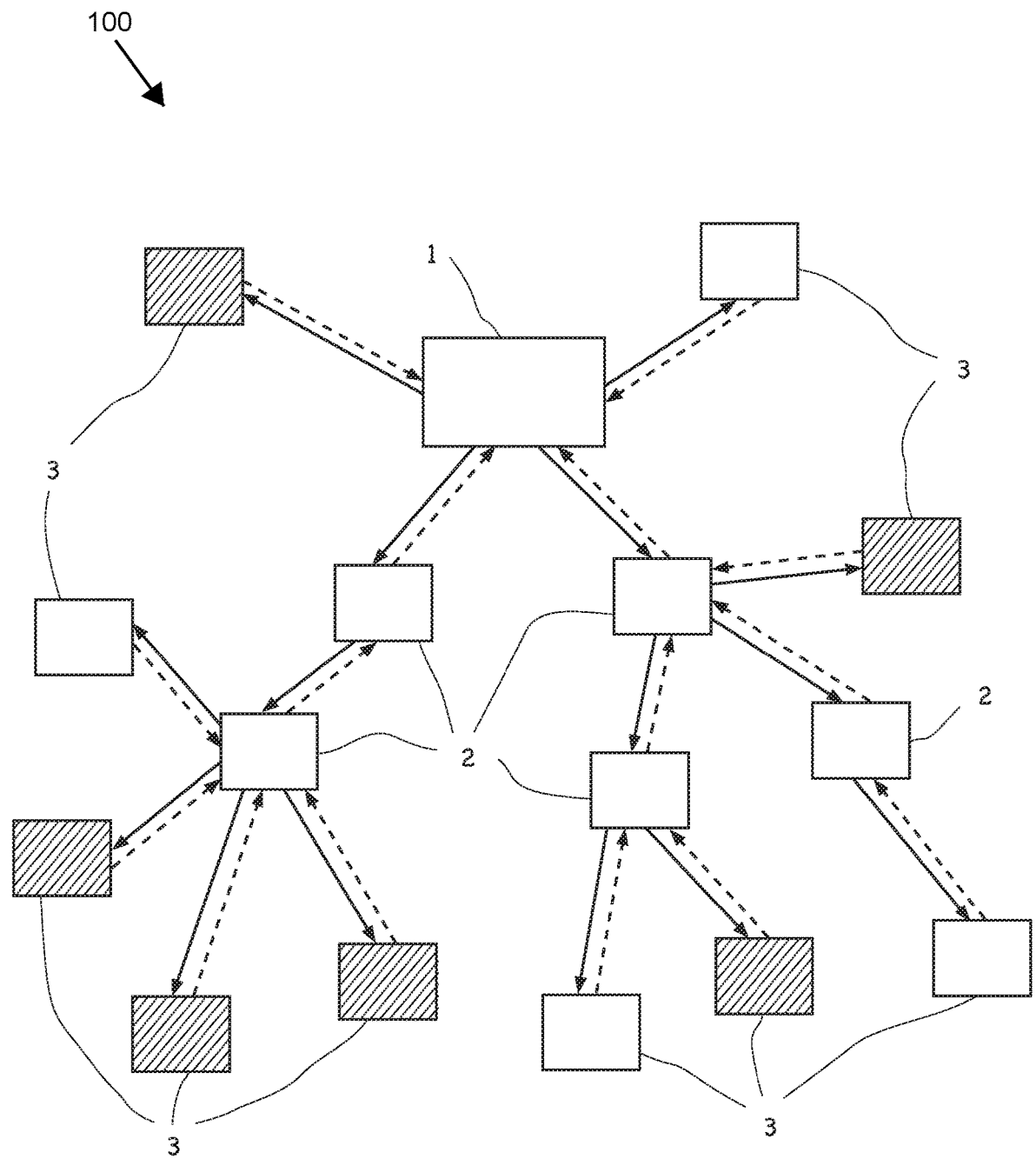
FIG. 1 illustrates an example media content transmission network.

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

In a system in accordance with the present disclosure, data may be communicated in different manners. For example, data may be transmitted over a network, such as in one-to-many manner (e.g., multicasting). Multicasting involves the transmission of data, such as a video or audio data, to multiple receiving devices, simultaneously in a single transmission from the source. Multicasting systems may be used, for example, for transmitting live TV via a network to many end-users. Copies of the data may be automatically created in other network elements, such as routers, if the topology of the network requires or allow it. These copies may be transmitted to devices further downstream in the network simultaneously, thereby effectively creating a hierarchy of multicasts of the same data, and thereby decentralizing the network traffic.

Multicasting may be implemented in different manners. For example, multicasting may be implemented in Internet Protocol (IP) applications for streaming media or internet television (IPTV). In IP multicasting, the implementation of the multicast topology (or hierarchy) may typically occur at the IP routing level, where routers create distribution paths for conveying data packets from the storage device to each multicast destination address.

End-user devices for rendering multicast program content may include a wide variety of devices such as set-top boxes (STBs), digital video recorders (DVRs), personal computers (PCs), laptop computers, tablet computers, mobile handsets, MP3 players etc. Many of these end-user devices may be capable of recording content received in real-time for subsequent playback at a later time. However, there may not be sufficient bandwidth in the network connection to the end-user device to permit the end-user to record one program while watching another, for example, or to record programs from two or more channels simultaneously.

More specifically, certain implementations of the present disclosure may be found in methods and systems for recording transmitted data, as described in the following in more detail with reference to the attached figures. In particular, existing methods and systems for handling (e.g., recording and subsequently data) data communicated over networks may have some deficiencies, particularly with respect to performance. For example, data may be transmitted over a network via multicast topology (or hierarchy) to a plurality of end-user devices (e.g., STBs, DVRs, PCs, laptop computers, tablet computers, mobile handsets, MP3 players, etc.) for rendering of multicast program content thereby. While such end-user devices may be capable of recording such multicast content that received (e.g., in real-time, for subsequent playback at a later time), network limitations may affect overall performance or usability. For example, there may not be sufficient bandwidth in the network to permit the end-user to record one program while watching another, for example, or to record programs from two or more channels simultaneously.

Some solutions may address potential issues and/or limitations relating to multicast transmissions and/or use of data transmitted in such manner. For example, to make program storage available in an intermediate recording server in the network, so that program content which cannot be recorded in real time by the end-user's device can be downloaded to the end-user's device later. For example, an IPTV system may be configured and/or implemented such that programs which the end-user wishes to record for future viewing may be streamed at a lower data rate than the real-time transmission rate, thus leaving more bandwidth available for other data traffic. Such systems may rely on the use of intermediate recording servers and impose requirements on the functionality and storage capacity of these servers. In another system, real-time and non-real-time content may be distributed using a hierarchical storage network arrangement to store the non-real-time content. Network congestion may be monitored, and non-real-time program content may be transmitted to end-users' devices during times when the network is idle. Such systems, however, are relatively complex, inflexible and require significant coordination and communication of information around the network in order for them to function effectively.

The present disclosure may allow for overcoming at least some of the disadvantages of prior art or such systems or solutions. In various example implementations in accordance with the present disclosure, network traffic and storage overhead required for the delivery of media content may be reduced, and multicast recording performance may be improved by giving each device in the network greater degree of autonomy (e.g., relative to legacy or proposed solutions), which may permit a reduction in the complexity of the storage coordination required across the network. The resulting improvements may be provided without sacrificing the end-user's experience of real-time recording of media content. Various example implementations in accordance with the present disclose may exploit advantages of both network-based storage and local storage; permitting a reduction in the number of requests for individual transmission signals going through the network to source media content server(s).

While some of the described example implementations may relate to multicasting (e.g., of audio or video content), the disclosure is not necessarily so limited, and it should be understood that a substantially similar approach may be used in any suitable application in which data of any type is bundled or packaged for simultaneous transfer to more than one recipient device.

Also, while only particular examples of networks may be described, the disclosure is not disclosure is not necessarily so limited to particular type of network, and "network" as used herein should be understood to encompass any kind of interconnection arrangement of data processing, routing, receiving or transmitting devices. For example, a network may comprise electrical, optical, and/or wireless connections in any constellation. Further, a hierarchical network as described or illustrated with respect to any example implementation of the present disclosure need not imply an exclusively hierarchical connectivity; in particular, it does not imply any restriction on the communication links between any network devices in the network.

Further, while only particular examples of devices may have been described, the disclosure is not necessarily limited to particular type of devices. Thus, references to "device" should not be taken as an indication of any particular kind of physical structure. Rather, a device may comprise discrete, but interconnected, modules, for example, or may be implemented partially or entirely as software or firmware running on a computer or dedicated electronic device, or embedded on a data carrier or integrated circuit.

References to "media" or "content" may be understood to comprise audio data, video data, live IP streams, webinars, file-sharing, and/or image data, for example. However, the disclosure is not necessarily so limited to particular type of media or content described with respect to any example implementation, and may apply substantially in similar manner to any suitable type of media or content.

As used in the present disclosure, the term "real-time" may refer to the end-user's experience of the timing of content delivery, and does not necessarily imply that content is received at exactly the time of transmission. Thus, "real-time" communication may allow for a margin of time-shifting across the network which may be due to data-processing during communication of data, such as routing, buffering or caching, or physical processes in the data transmission.

FIG. 1 illustrates an example media content transmission network. Shown in FIG. 1 is an example network 100 (e.g., an internet protocol (IP) based network).

The network 100 may comprise suitable circuitry for implementing various aspect of the present disclosure. For example, the network 100 may be configured for use in transmitting multicast transmissions of IP data (e.g., IP television programs). Nonetheless, the network 100 may also be operable to transmit unicast or broadcast transmissions if required.

In the example implementation depicted in FIG. 1, the network 100 may comprise a source media content server 1, a plurality of end-user devices 3, and one or more intermediate media content servers 2. Each of the source media content server 1, the plurality of end-user devices 3, and the one or more intermediate media content servers 2 may comprise suitable circuitry for implementing various aspects of the present disclosure.

In example use scenario, the source media content server 1 may transmits media content (e.g., corresponding to particular TV program), to the plurality of end-user devices 3. The transmission across the network 100 from the source media content server 1 to the end-user devices 3 may be via the one or more intermediate media content servers 2. In the case of a multicast transmission, the transmission of the media content to certain groups of end-user devices 3 may be delegated to the one or more intermediate media content servers 2, such as in a hierarchical fashion. Doing so may allow reducing the data traffic from the source media content server 1.

Each end-user device 3 may request media content by sending a media content request (indicated by dashed arrowed lines in FIG. 1) to its associated upstream media content server 2. Media content delivery routes (indicated by solid arrowed lines in FIG. 1) may be used to facilitate the delivery of requested media content. In an example scenario shown in FIG. 3, devices that have requested particular media content are indicated by shading. If an intermediate content server 2 has received a media content request from one or more downstream end-user devices 3, the intermediate media content server 2 may in turn send an upstream media content request to a further upstream media content server 2, and eventually to the source media content server 1. The media content may then be distributed, at the scheduled transmission time, from source media content server 1 via intermediate media content servers 2 to end-user devices 3.

In accordance with an example implementation of the present disclosure, some or all of the end-user devices 3 of FIG. 1 may comprise a recording component (e.g., device) suitable for recording the media content received over the network 100 from the source media server 1 via one or more intermediate media content servers 2. For example, such recording-capable end-user devices 3 may be provided with upstream recording devices to which these end-user devices 3 may delegate all or part of a recording task. A particular end-user device 3 may delegate all or part of a recording task, for example, when that device is not able to perform the recording task. The upstream recording function may advantageously be provided by the intermediate media content servers 2, since these may in any case receive the media content to be recorded. Alternatively, the upstream recording function may be provided by separate upstream recording devices (e.g., integrated into or communicatively coupled to the user-end devices). An example implementation that includes both alternatives is discussed with respect to FIG. 2.

Figure 2:
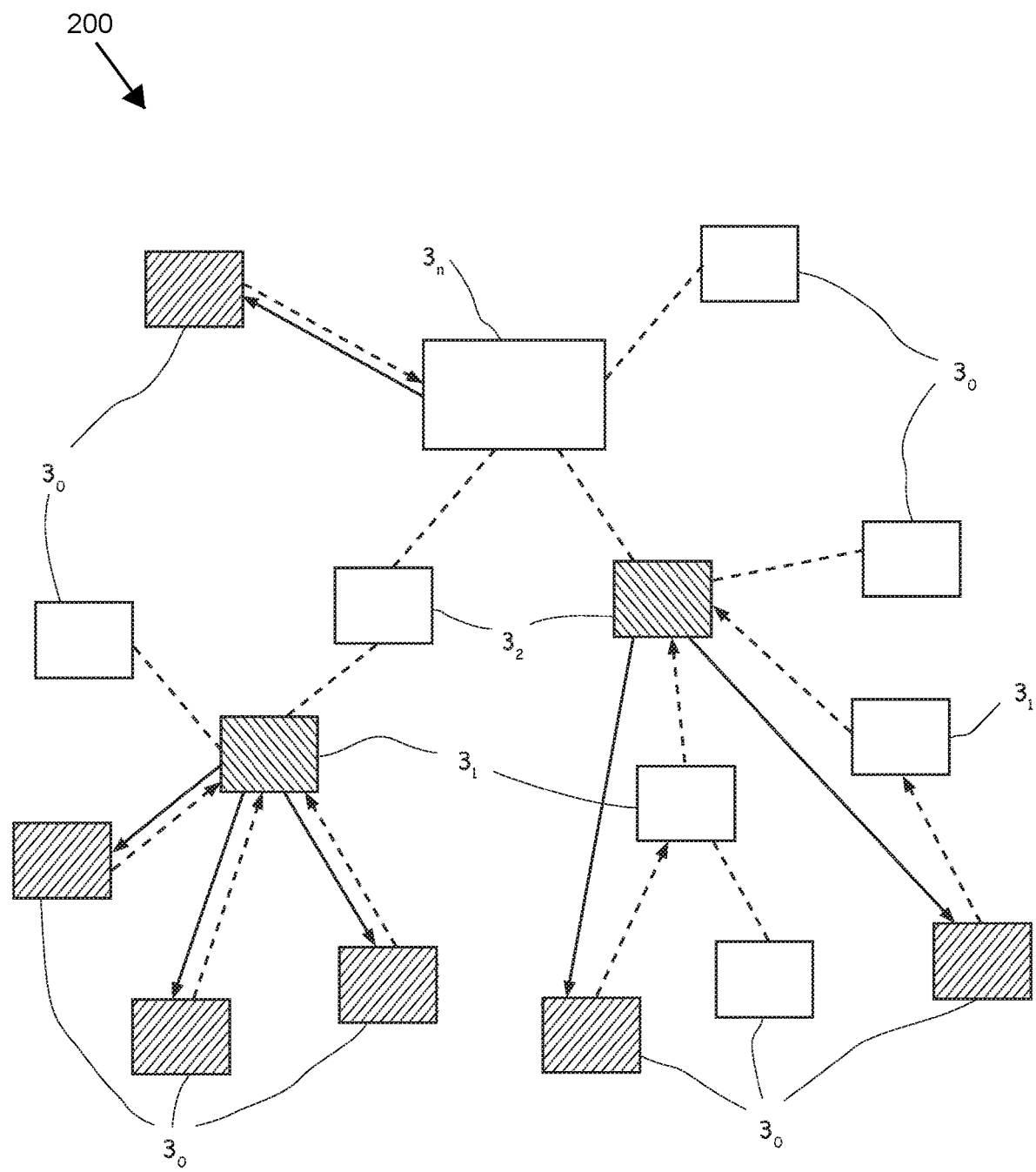
FIG. 2 illustrates an example recording management system, in accordance with the present disclosure.

FIG. 2 illustrates an example recording management system, in accordance with the present disclosure. Shown in FIG. 2 is an example network 200, which may be substantially similar to the network 100 of FIG. 1.

In this regard, the network 200 may comprise suitable circuitry for implementing various aspects of the present disclosure. For example, as with network 100 of FIG. 1, the network 200 (e.g., an internet protocol (IP) based network) may be configured for use in transmitting multicast transmissions of IP data (e.g., IP television programs), but may also be operable to transmit unicast or broadcast transmissions if required. The network 200, however, as depicted in the particular implementation illustrated in FIG. 2, shows how elements in the network hierarchy can be operated to record the transmitted media content during scheduled transmission time rather than showing the transmission of media content across the network.

In this regard, the network 200 may comprise a plurality of recording devices $3_0$, which may correspond to the end-user devices 3 of FIG. 1, which may be configured to request and receive a media transmission from the source media content server 1 of FIG. 1. Each of the recording devices $3_0$ may comprise suitable circuitry for implementing various aspects of the present disclosure. For example, each of the recording devices $3_0$ of FIG. 2 is shown as being connected to an upstream recording device (e.g., recording devices $3_1$, $3_2$, $3_n$) further upstream in the hierarchy of the network. As used in the network 200, an upstream recording device (e.g., one of recording devices $3_1$, $3_2$, $3_n$) may be an instance of the intermediate media content servers 2 of FIG. 1. Alternatively, an upstream recording device may be a separate device on the network, comprising suitable circuitry for implementing various aspects of the present disclosure. The upstream recording device $3_n$ may be a full-content recording device, which may be operable to record all of the media content which was transmitted to the recording devices $3_0$, also referred to as requesting devices, shown shaded in FIG. 2. For example, the full-content recording device $3_n$ may be the source media content server 1 described with reference to FIG. 1.

Each of the recording devices $3_0$ may be instructed (e.g., by an end-user) to record a media transmission, such as a TV program, which may be scheduled to be transmitted over the network by the source media content server 1 at a scheduled transmission time. However, it may be that one or more of the recording devices $3_0$ may be unable to record the transmitted media content at the scheduled transmission time. This may occur, for example, if the end-user has instructed the recording device to record multiple programs on different channels at the same time and in a high definition format. In this case the network bandwidth and/or the recording device's storage may be insufficient to record all of the requested TV programs as they are being transmitted. When that occurs, the recording device $3_0$ may delegate the task of recording the requested program to an upstream recording device (e.g., a recording device $3_1$) higher up the hierarchy.

Accordingly, the term "upstream recording device" is used in this text to refer to a device which acts as a proxy recording device for a downstream recording device. An upstream recording device may be an intermediate network device $3_1$ or $3_2$ in the hierarchy, or it may be the full-content recording device (e.g., the source media content server 1). The term "downstream device" is used in this text to refer to a recording device which is capable of deferring or delegating to an upstream recording device the task of recording media content transmitted from the source media content server 1. In this regard, a downstream device may be an end-user device such as an STB, a PC, a DVR or a smartphone, etc.; or it may itself be an intermediate network device $3_1$, $3_2$, in which case it may function as both a downstream device and an upstream device. Further, the term "recording device" as used herein may not limited to recording devices operated (e.g., instructed) by an end-user. Rather, recording devices may also refer to a device, such as an intermediate network device, where media content may be recorded for subsequent off-loading to devices further downstream.

If it happens that the upstream recording device $3_1$ does not carry out the delegated recording as instructed by the downstream recording device $3_0$, then the upstream recording device $3_1$ may in turn delegate all or part of the recording task to a further upstream recording device (e.g., a recording device $3_2$). If necessary, the sequence of upstream delegation of recording may continue until it encounters a full-content recording device $3_n$ which contains the full recording of the media content, at which point no further upstream delegation may be possible or necessary. In the example arrangement shown in FIG. 2, the full-content recording device $3_n$, which stores substantially all of the transmitted media content after it has been transmitted, may be the source media content server 1 of FIG. 1.

Thus it may happen that, when an end-user instructs the local recording device $3_0$ to record a first TV program which is scheduled to be transmitted at first time frame (e.g., between 21:30 and 22:30), and a second TV program at a second time frame (e.g., starting at 22:00 and finishing at 23:00), then the user's recording device $3_0$ may instruct an upstream recording device $3_1$ to record the second program, such as during the overlapped time between the two transmission time frames—e.g., from 22:00 until 22:30. The upstream delegation of the recording may be transparent to the user. In other words, from the user's point of view, the recording would appear as if it had been carried out by the local recording device $3_0$. Subsequently, when the user may wish to view the recorded second program, in which case the part(s) of recording handled upstream (e.g., first half-hour of the program) may be retrieved from the upstream recording device $3_1$, while the remaining part(s) (e.g., the second half-hour of the program) may be retrieved from the recording storage of the local recording device $3_0$. The retrieval of the different parts of the recording from different recording devices is transparent to the user.

As shown in the implementation depicted in FIG. 2, some of the recording devices ($3_0$) are shown with (i.e., connected directly $t_0$) an upstream recording device which is the full-content recording device $3_n$, in which the full media content is stored. Other recording devices $3_0$ have upstream recording devices $3_1$, $3_2$ which are intermediate in the network hierarchy. In each case, the end-user device $3_0$ is provided with access to an upstream recording device via an upstream record instruction connection, by means of which a downstream recording device may instruct an upstream recording device to record all or part of a requested media content.

The upstream/downstream associations are denoted in FIG. 2 by dashed lines. Actual upstream recording instructions are represented by arrowed dotted lines. Subsequent downstream transmission of recorded media content which has been recorded upstream is indicated by solid arrowed lines.

As shown in the example implementation depicted in FIG. 2, the network 200 has a hierarchical structure which relates to the recording of the transmitted media content (e.g., content transmitted from source media content server 1), and not necessarily to the network used for the transmission itself. The network structure for the content transmission was described with reference to FIG. 1, and may be the same as the network arrangement for the recording management shown in FIG. 2, or it may be different. For the purposes of this text it can be assumed that a transmission network is present, even if not illustrated.

In a multicast transmission, only a subset of the end-user devices $3_0$, such as those shown shaded in FIG. 2, may request delivery of the media content transmitted across the network at a scheduled transmission time. These requests may be made in order to view the media content transmission at the time of transmission, or to record the media content for later playback at the respective end-user device $3_0$. In such an example multicast scenario, the media content would normally be transmitted to all the requesting (shaded) end-user devices $3_0$ for a source server (e.g., the source media content server 1), or from intermediate media content servers $3_1$, $3_2$.

In instances where an end-user may program a recording in the user's recording device $3_0$ (e.g., STB, DVR, PC, mobile phone, etc.), the recording may be made locally in the end-user's recording device $3_0$; or, if conditions (e.g., available bandwidth on the transmission network, storage capacity of the recording device, image quality requested by the end-user, etc.) are such that local recording is not possible or inconvenient, the recording device $3_0$ may instruct an upstream recording device (e.g., an upstream recording device $3_1$ or $3_2$) to record some or all of the media content during the transmission period.

In an example implementation, an upstream recording device (e.g., one of the upstream recording device $3_1$, $3_2$, each of which being, for example, an instance of the intermediate media content server 2, as described with reference to FIG. 1) may aggregate and manage media content transmission to multiple downstream devices, or it may be a different device.

In an example implementation, copies of the transmitted media content may be made at multiple locations in the network. In a multicast system, the content may in any case be recorded in the full-content recording device $3_n$ (at least for a limited time, such as a week), which ensures that the recording will be available to all end-users who requested it, even if the requested content was not recorded on their local recording device $3_0$ at the time of transmission. In an IPTV system, all channels may typically be recorded all the time (e.g., in the source media content server 3), so that each recording may always be available centrally. The source media content server 3 may be configured to store a "sliding window" of (e.g., 24 hours, 7 days, etc.) of transmitted content, to ensure that the end-users' recording requests can be fulfilled during the specified period.

In instances where the program content is to be recorded at the end-user's device $3_0$, a real-time delivery of the media content may not be strictly required, since the purpose of a recording is that it will be viewed at a later time. Nevertheless, the end-user's experience of the recording system is enhanced if he or she retains the impression that the recording is being carried out in real time, and that the requested media content is locally recorded and available to play back.

Figure 3:
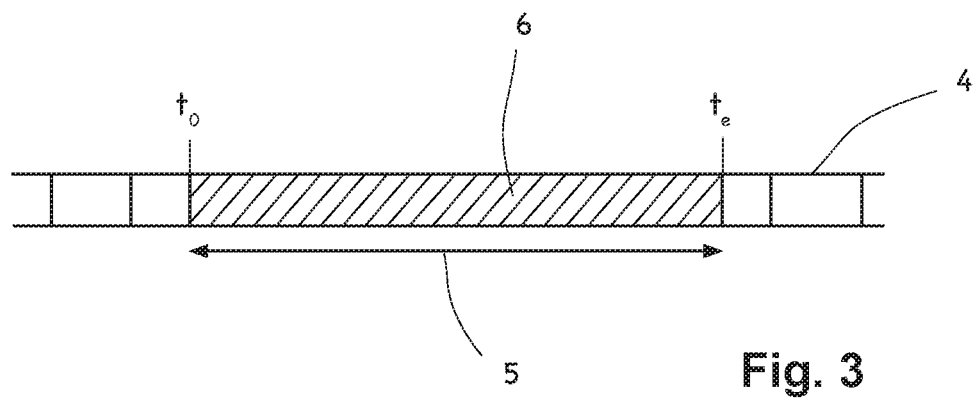
FIGS. 3 to 5 illustrate an example timeline of media content transmission, in accordance with the present disclosure.
Figure 4:
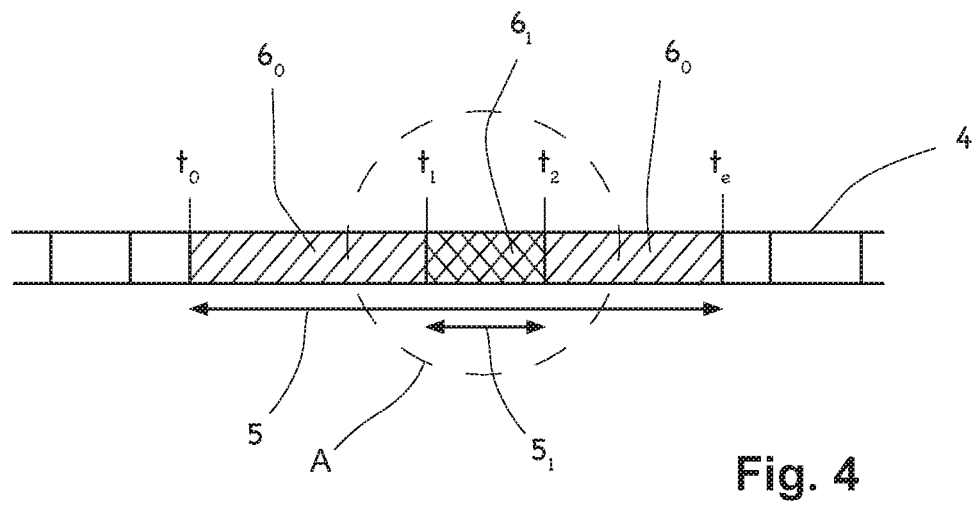
Figure 5:
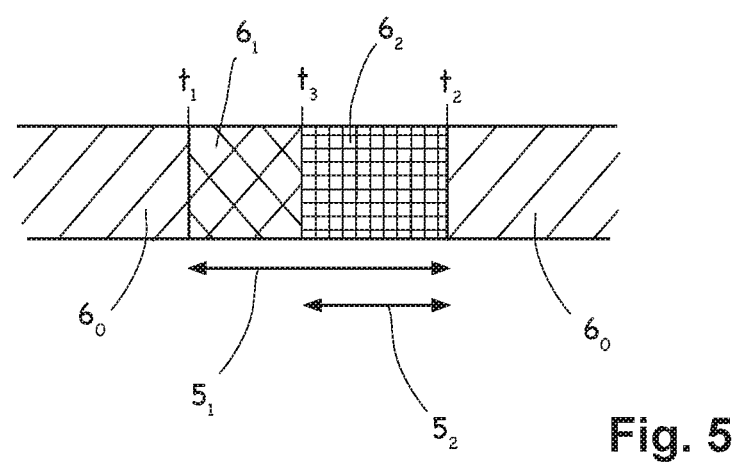

FIGS. 3 to 5 illustrate an example timeline of media content transmission, in accordance with the present disclosure.

Shown in FIG. 3 is a simple timeline representation of a broadcast of particular media (e.g., TV program) content 6. In an ongoing transmission 4, the transmitted media content 6 begins at time to and ends at time $t_e$, with a transmission period ($t_e$–$t_0$) indicated by reference 5. The transmitted media content 6 may be programmed to be recorded by a number of end-user devices $3_0$ such as those shown shaded in FIG. 2. Thus, when the content 6 is broadcast, beginning at time $t_0$, it should be received and recorded by those end-user devices $3_0$ which have been programmed to record it. In this case, the end-user devices $3_0$ which have been programmed to record the media content 6 will receive the media content 6 and record it locally during the transmission period 5, for subsequent playback.

However, some of the end-user devices $3_0$ which were programmed to record the transmitted media content 6 may not be able to record it during the scheduled transmission time 5, or they may not be able to record all of the media content 6 at the time it is transmitted. For example, an end-user device may not be able to record the program broadcast during a part $5_1$ of the transmission period 5, as illustrated in FIG. 4. The part $5_1$ begins at a time $t_1$ and ends at a time $t_2$. In this example, the user's recording device $3_0$ is able to record the first and last portions $6_0$ of the transmitted media content 6 during the scheduled transmission period 5. The timeline example described herein only illustrates a case in which one portion $6_1$ of the program is not recorded at the scheduled time by recording device $3_0$. However, it should be understood that the recording method and device of the disclosure may be used in situations in which there are multiple portions $6_1$ of the media content 6 which the recording device $3_0$ does not record at the scheduled transmission time. For example, it may be that the recording device $3_0$ does not record any of the media content 6 during the scheduled transmission time, and delegates the task of recording the media content 6 for the whole of the scheduled transmission period.

Shown in FIG. 5 is an enlargement of the section A of FIG. 4, and depicts a timeline corresponding to a situation in which the upstream recording device $3_1$ further delegates the task of the recording of the media content 6 to a second upstream recording device ($3_2$ in FIG. 2) for the portion of the transmission period identified in FIG. 5 by the reference 52, and beginning at time $t_3$.

Figure 6:
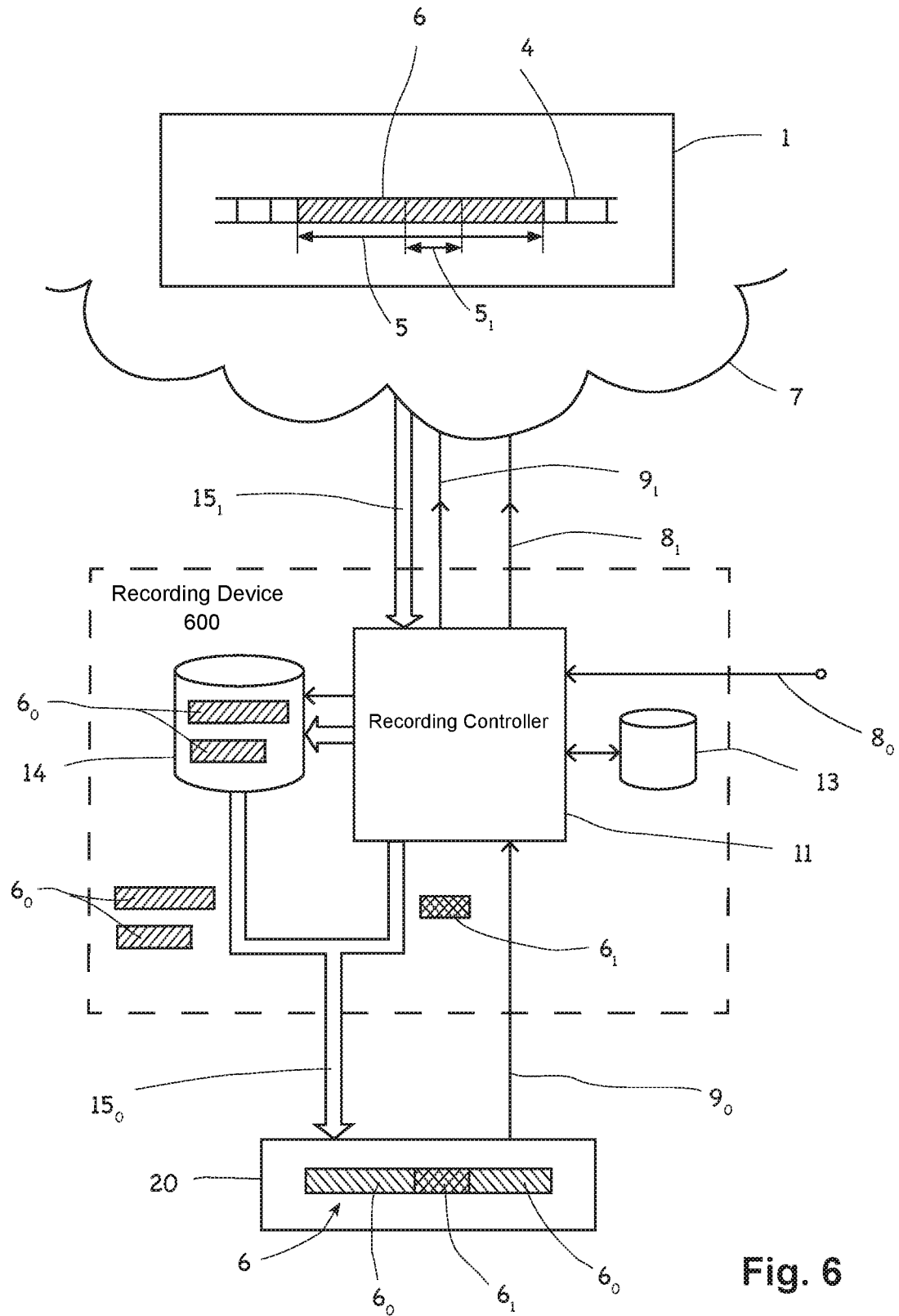
FIG. 6 illustrates an example recording device, in accordance with the present disclosure.

FIG. 6 illustrates an example recording device, in accordance with the present disclosure. Shown in FIG. 6 is an example recording device 600 (e.g., a recording device $3_0$) indicated by the dotted line.

The recording device described in FIG. 6 may comprise suitable circuitry for handling recording of transmitted data, in accordance with the present disclosure. As described with reference to FIG. 6, the recording device 600 may comprise a local recording device $3_0$, which may be used in recording data during an example content transmission corresponding to the example transmission timeline of FIGS. 3 to 5. In particular, the recording device 600 (as indicated by dotted line) may be configured to record program content 6 transmitted during a transmission period 5 by a source media content server 1 across a network 7 (e.g., the Internet). This example may represent, for example, an end-user's recording device $3_0$, in which case it may then be arranged to output recorded media content data to a suitable rendering device 20. For example, the rendering device 20 may comprise a television, computer or mobile phone running suitable viewing application, etc. However, in another example implementation, the recording device arrangement illustrated in FIG. 6 (particularly, the recording device 600) may be an intermediate device in a network, located between an upstream device and a downstream device. Thus, as described hereafter, the recording device 600 may be generalized beyond the specific case where it is an end-user device (e.g., recording device $3_0$) for use in local recording and play-back of a recorded program.

As shown in the example implementation illustrated in FIG. 6, the recording device 600 may comprise a recording controller 11, a local content storage 14 and a recording mapping storage 13. The local content storage 14 may comprise suitable circuitry for storing media content received from the source media content server 1, for example. The recording mapping storage 13 may comprise suitable circuitry for storing reference information relating to portions of recorded data (e.g., content).

The recording controller 11 may comprise suitable circuitry for controlling and/or managing recording functions. For example, if the recording controller 11 receives a record instruction signal $8_0$ instructing the recording device 600 to record media content 6 during the scheduled transmission time 5, the recording controller 11 may determine whether the media content 6 should be recorded locally, or partly locally, or whether the recording of media content 6 should be delegated to an upstream recording device (not shown in FIG. 6). Following the timeline example of FIGS. 3 to 5, the recording controller 11 may determine that a part $6_1$ of the media content 6 transmitted during transmission period $5_1$ should be recorded upstream, while the remainder $6_0$ of the media content should be recorded locally. The parameters which are taken into account by the recording controller when determining whether or not to delegate the recording of part or all of the media content 6 to an upstream device $3_1$ will be described in more details below.

While the various connections to the recording device 600 are shown as distinct connections in FIG. 6, it should be understood that is merely illustrative, for ease of understanding, and that such connections may be implemented in any convenient manner—e.g., as one or more communication protocols on the same (wired and/or wireless) connection(s) in any combination.

The local content storage 14 and recording mapping storage 13 may be integral or external to the recording device 600. Thus, the term "local" is used merely to indicate that the storage can be written to and read from under control of the recording device 600.

In some instances, the functionality of the recording controller 11 may be determined by a recording status parameter (or more than one recording status parameter), which may determine whether, or to what extent, a particular scheduled media content transmission 5 is to be recorded in the local content storage 14 of the recording device 600. The recording status parameter(s) may represent current conditions of the recording device 600 which may include, for example, one or more of: a bandwidth availability between an upstream media content server 1, 2 and the recording device 600; a processing capacity of the recording device 600; a local storage availability of the local content storage 14; a recording preference provided by an end-user or a network provider; etc.

At or before start time to of the scheduled transmission period 5 of the requested media content 6, the recording controller 11 may determine a value of the recording status parameter(s), and, if a recording status parameter has a value which indicates that local recording is possible or convenient, starts to record the transmitted media content 6 in the local storage 14, as the content is received by the recording device 600. If the recording status parameter remains unchanged during the broadcast period 5, then the full media content 6 may be recorded in the local storage 14.

However, if a recording status parameter is such that the task of recording the transmitted media content 6 should be delegated upstream (e.g., at time $t_1$ in FIG. 4), then the recording controller 11 may halt recording of the media content data 6 in the local storage 14, and the recording may be carried out by an upstream recording device (e.g., a upstream recording device $3_1$; not shown in FIG. 6). If the recording status parameter(s) subsequently change again (at time $t_2$ in FIG. 4, for example) so as to indicate that local recording by recording device 600 may recommence, the recording controller 11 may again start recording the received media content 6 in local storage 14.

For example, with reference to the timeline depicted in FIGS. 3-5, after recording of part $6_1$ of the content 6 is omitted from local storage 14, the recording then resume and continue until the end $t_e$ of the real-time broadcast period 5 of the requested media content 6. At this point, two portions, labeled $6_0$, of the program 6 have been recorded in local storage 14, and the upstream recording device (not shown) has been instructed to record the omitted part-recording $6_1$. Thus, part-recording $6_1$ should now be recorded in the storage of the upstream recording device. The parts $6_0$ and $6_1$ may be any length, from zero to the full length of the program 6.

In instance where the recording function delegates upstream during parts $5_1$, $5_2$ of the transmission period, as described above, the recording device 600 may be dependent on access to the upstream recording devices (e.g., upstream recording device $3_1$, $3_2$) for supplying the parts $6_1$, $6_2$ of the media content 6 which were recorded by the upstream recording device.

In an example implementation, the parts $6_1$, $6_2$ of the media content 6 which could be omitted from the local storage 14 because they are recorded by upstream recording device(s) may nevertheless be partially recorded (e.g., recorded at low resolution) in the local storage of the recording device 600. For example, the recording device 600 may record a low-resolution or sampled version of the media content 6 during the parts $5_1$, $5_2$ of the transmission period which are delegated to the upstream recording device(s) $3_1$, $3_2$.

If the recording status parameter indicates that there is not enough network bandwidth and/or storage capacity available to the recording device 600 for it to be able to record the media content transmission at full resolution during parts $5_1$ of the transmission period 5, it may still be possible to record those parts $5_1$ at a lower resolution, for example. In such instances, locally recorded content $6_0$ may then be played back in high resolution, for example, while upstream-recorded content $5_1$ is still locally available at a lower resolution for offline playback. This may be done by, for example, devices which may not be constantly connected to the relevant network (e.g., the Internet), such as a mobile or hand-held device, and which may not have constant access to the upstream device $3_1$ after the transmission time of the upstream-recorded media content $6_0$.

Accordingly, instead of an incomplete recording with gaps, the recording device 600 may be at least be able to play back recording of the full transmission period 5, albeit with parts $5_1$ only played back at a lower resolution. A similar approach may be used in a first upstream recording device (e.g., upstream recording device $3_1$) which is instructed by the recording device 600 to record the media content transmission 6 during parts $5_1$ of the scheduled transmission period 5, in that portions $5_2$ which are delegated further upstream to a second upstream recording device (e.g., upstream recording device $3_2$) may nevertheless be sampled or recorded in low resolution by the first upstream recording device $3_1$. Such locally sampled or low-resolution media content may also be useful when performing rapid scanning through the media content recording during playback, for example.

When an end-user subsequently requests playback of the recorded media content 6, for using media content request $9_0$, the recording controller 11 may retrieve the first locally recorded portion $6_0$ of the media content 6 from the local storage 14 and delivers it to the playback device 20 via output connection $15_0$. Before the end of the playback of the first locally recorded portion $6_0$, the recording controller 11 may issue an upstream media content request 91 to an upstream recording device (not shown), requesting the omitted part $6_1$ of the media content 6, and delivers it to the playback device. The changeover from locally recorded content $6_0$ to upstream recorded content $6_1$ may be arranged so that the switch is imperceptible to the end-user.

For example, while the locally omitted part $6_1$ is being received from the upstream recording device for playback on playback device 20, the recording controller 11 may (e.g., based on the current recording status parameter) record the received portion $6_1$ in the local storage, thereby achieving a complete (or at least a more complete) local recording of the media content 6 in the local storage 14.

If none of the media content 6 was recorded locally during the scheduled transmission period, all of the content will all need to be requested from upstream recording device(s), which may transmit the media content to the recording device 600. The subsequent transmission of the media content may be performed as a unicast transmission to the recording device 600; or, if multiple recording devices $3_0$ request media content 6 via the same upstream recording device, then the upstream recording device may transmit the media content 6 to the multiple downstream recording devices $3_0$ at the same time. This transmission may itself constitute a multicast transmission, or a simple broadcast, for example.

In an example implementation, the recording controller 11 may be configured so that, if the recording status parameter (s) indicate that it is possible or convenient, the recording controller 11 may request subsequent transmission of one or more of the omitted content portion(s) $6_1$ from the upstream device $3_1$ at a time after the broadcast time of the omitted content portion(s) $6_1$, thereby "filling in" the missing portions of the local recording, so that as much of the recorded content as possible is stored locally. This filling in operation may be performed, e.g., during idle time of the network.

In order to manage the various locally-recorded parts $6_0$ and upstream-recorded parts $6_1$ of a recording, the recording controller 11 may store reference information (e.g., mapping pointers), in the recording mapping storage 13. For example, each mapping pointer may comprise information about the identity of a content portion and location information about where the content portion may be retrieved from. The mapping pointer may also comprise continuity information indicating a previous content portion and/or a following content portion. An example of a mapping pointer scheme is described in more detail with respect to FIGS. 8 and 9.

The recording mapping storage 13 may be local to the recording device 600, or it may be located externally to the recording device 600 (e.g., it may be held at an upstream device, or at another location where the mapping pointer information may be writable and readable by the recording controller 11). Holding the recording mapping storage 13 remotely (e.g., elsewhere on the network) may not significantly add to the network traffic, since the amount of data which must be read from and written to the recording mapping storage 13 may be small.

In an example implementation, the recording controller 11 may be operable to delete, overwrite or rearrange recordings in the local storage, such as based on a recording priority parameter of the recordings. Such a recording priority parameter may be determined, for example, as a function of one or more of: an elapsed time since the beginning ($t_0$) of the broadcast period 5 of the recorded multicast 6; an elapsed time since the end ($t_e$) of the broadcast period 5 of the recorded multicast 6; a playback probability of the recorded multicast 6, where the playback probability is calculated based on one or more playback patterns of previous recordings; a recording storage preference provided by an end-user or a network provider; the length of the recording; and a popularity parameter of the recorded multicast, received from the source media content server 1.

In an example implementation, recording status parameter and/or the priority request parameter may use a predictive data request forecast algorithm to optimally balance local memory requirements, anticipated network capacity (e.g., bandwidth) and local processing capacity. The predictive algorithm may be provided with a database of previous performance characteristics, and/or suitable heuristics for predicting the parameters mentioned. By balancing the resource usage in this way, it is possible to greatly optimize the network load and the usage of the system components, especially networking components.

In instances where multicast content is transmitted from the source media content server to an "end-user" recording device 600 via one or more intermediate devices, for example, the intermediate device(s) may each be configured as an upstream recording device $3_1$, $3_2$ as described above and illustrated in FIG. 7. In this regard, the intermediate device $3_1$, $3_2$ may "see" the source media content server as an upstream recording device (e.g., source of requested media content), and it may see the end-user recording device 600 as a downstream device to which content is to be transmitted (e.g., played back). The end-user device 600 then sees the intermediate device $3_1$ as an upstream device. The end-user device 600 may also see the source media content server 1 as an upstream device. When recording media content 6, the end-user recording device 600 may record content supplied by the source media content server 1 via an intermediate device $3_1$, $3_2$, and/or it may record media content which is not available from the intermediate device $3_1$, $3_2$ directly from the source media content server 1.

Figure 7:
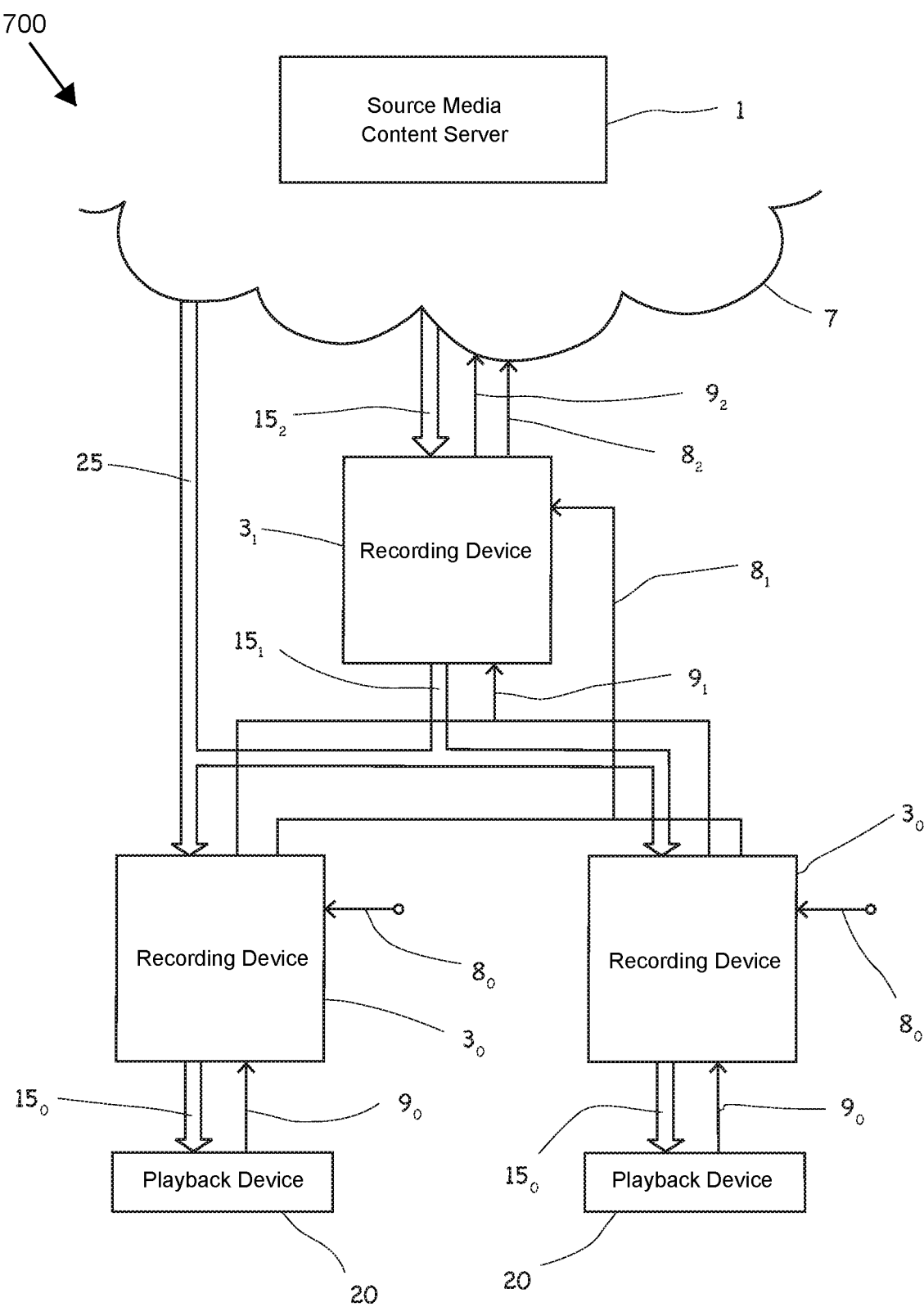
FIG. 7 illustrates an example network arrangement of multiple recording devices, in accordance with the present disclosure.

FIG. 7 illustrates an example network arrangement of multiple recording devices, in accordance with the present disclosure. Shown in FIG. 7 is an example networked arrangement 700 of recording devices.

The networked arrangement 700 may comprise three instances of a recording device, implemented in accordance to the present disclosure, which are indicated by references $3_0$ and $3_1$, and with their respective connections labeled correspondingly. The recording device $3_1$ may functions as a downstream device for an upstream device $3_3$ (not shown) and as an upstream device for the two recording devices $3_0$. Each of the recording devices $3_0$ may function as a downstream device for recording device $3_1$ and as an upstream recording device for a downstream device (e.g., a playback device 20).

Such an arrangement may represent just one small part of a networked multicast transmission system which may extend across the network, in which each recording device may be operable to receive, record, and/or transmit data which cascades through the network. Usage (e.g., filling) of the local storages 14 of the recording devices may be carried out in a broadcast manner over multiple routes through the network. The characteristics of the devices' local storage 14 and/or processing components may vary. For example, the characteristics may be varied in order to balance the usage on the network.

In an example use scenario, recordings stored in the storage(s) of upstream recording devices $3_1$, $3_2$ may be deleted or overwritten, in the same way as with end-user recording devices, for example if the probability of the content being requested becomes low, or if a higher-priority content must be stored in its place. A priority list for the recordings may be updated over time. Each recording request for a particular recording may have the effect of incrementing the retention priority for the particular recording, while each playback of the recording may decrement the priority. If the priority of a recording falls below a certain threshold (depending also on, e.g., the storage capacity, etc.), the recording may be deleted or overwritten. It may be possible to predict the capacity requirements of the intermediate storage, such as according to the learned request and playback patterns. For example, from prior operations, it may be "learned" that most recorded media content is played back within three days or not at all. Thus, once a recording is more than three days old, its retention priority can be significantly reduced.

Figure 8:
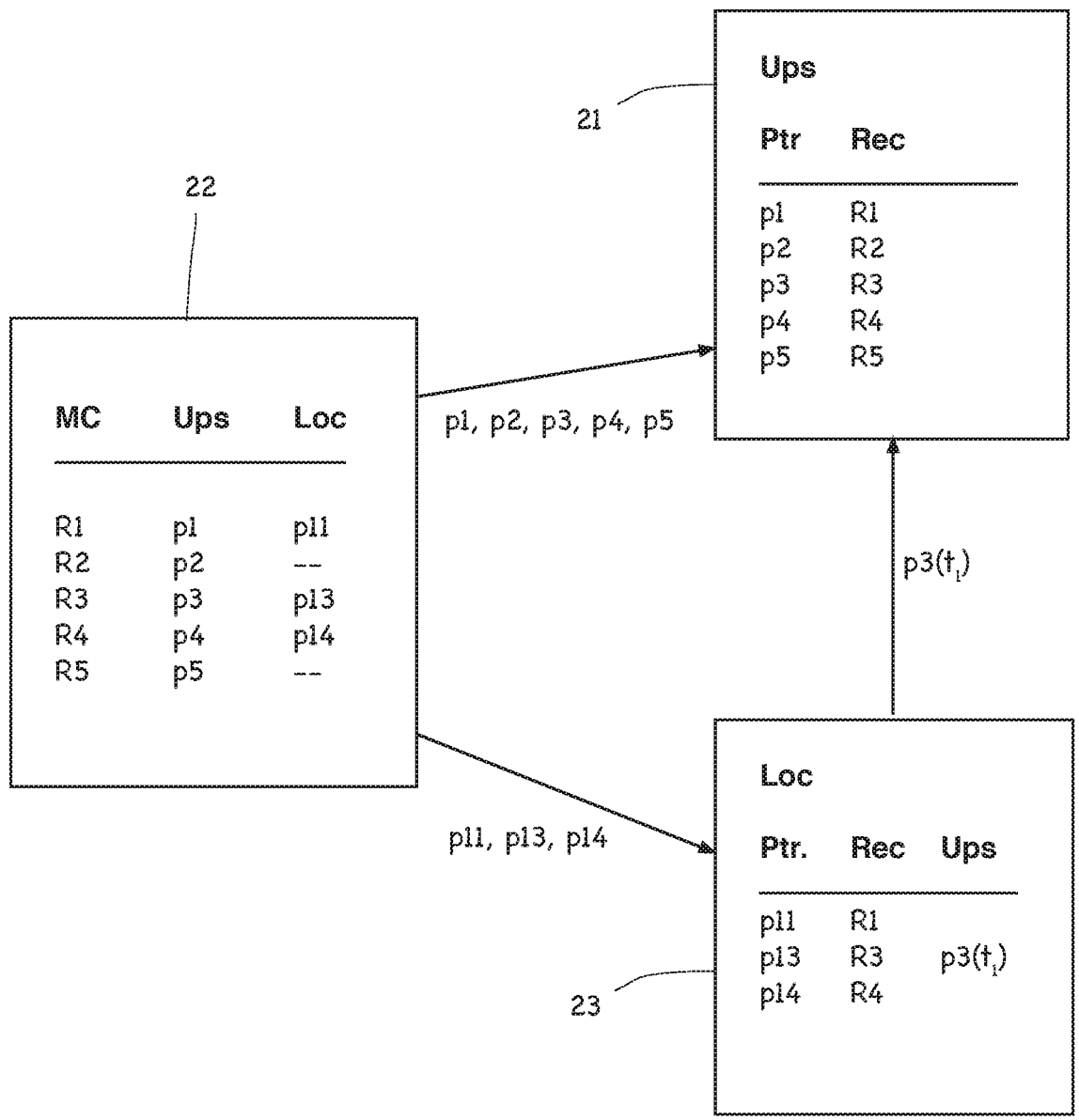
FIGS. 8 and 9 illustrate an example pointer scheme which may be used in an example implementation, in accordance with the present disclosure.
Figure 9:
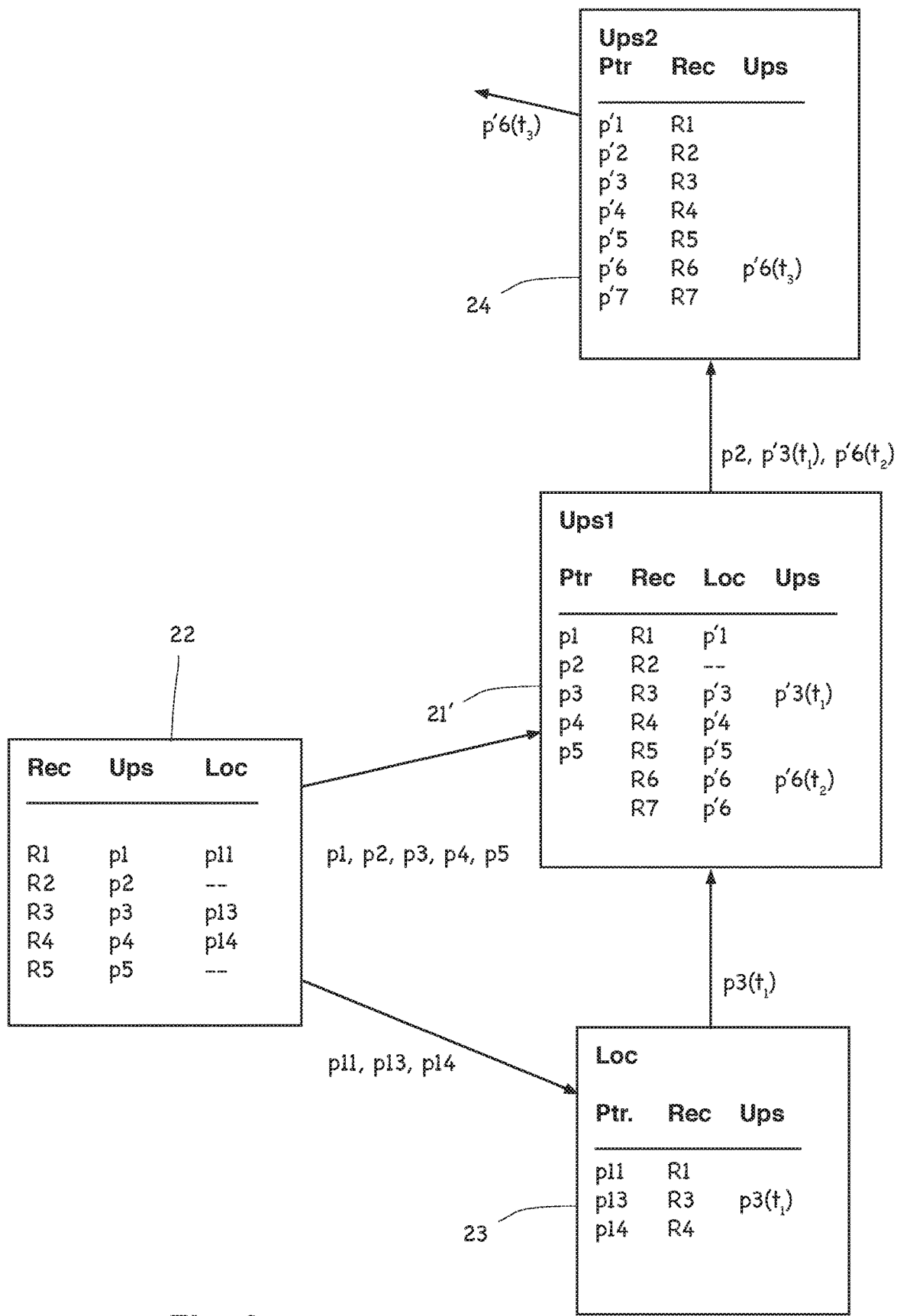

FIGS. 8 and 9 illustrate an example pointer scheme which may be used in an example implementation, in accordance with the present disclosure.

Shown in FIG. 8 is a recording table 22, which may comprise information about a number of requested recordings (e.g., five requested recordings R1 to R5). For each of these recordings, there may be one or more corresponding stored pointers (e.g., p1, p2, etc.) which may indicate where the respective recording may be retrieved from. In the illustrated example shown in FIG. 8, the stored pointers p1-p5 may indicate that all of the requested recordings R1 to R5 are available from an upstream device; and pointers p11, p13 and p14 indicated that three of the programs (R1, R3 and R4) are recorded in local storage 14.

Also, shown in FIG. 8 is a supplementary recording table 23, which may comprise more detailed information about the content stored in local storage 14 of the local recording device $3_0$. In the illustrated example, pointer $p3(t_1)$ may indicates that a part of recording R3 was omitted, and must be retrieved from an upstream device (e.g., upstream recording device $3_1$). If the end-user plays the recording R3, the playback content may initially be retrieved from local storage 14. Then, when it reaches the time $t_1$, the content retrieval may switch to the upstream device $3_1$, and the playback of recording R3 may continue seamlessly.

The mapping pointer information (p1, p2, . . . ) may, for example, comprise: a portion start time value, identifying a real-time start time ($t_0$, $t_1$, $t_2$) of the particular part $6_0$, $6_1$ of the transmission period 5 of the media content; a portion end time value, identifying a real-time end time ($t_1$, $t_2$, $t_e$) of the particular part $5_0$, $5_1$ of the transmission period 5; a portion duration, identifying a real-time duration ($t_1-t_0$, $t_2-t_1$, $t_e-t_2$) of the particular transmission period $5_0$, $5_1$; at least one first content portion address, identifying a first storage location of the start, the end and/or the extent of a local storage location of the particular first content part $6_0$ stored in the local data storage 14; and/or at least one second content portion address, identifying a second storage location of the start, the end and/or the extent of a remote storage location of a particular second content part $6_1$ in a remote data storage of the upstream recording device $3_1$. In this regard, the term "first content part" may refer to part of the requested content which may be recorded in the local storage 14 of the recording device, while "second content parts" may refer to part recorded in the recording storage of upstream recording devices (e.g., the upstream recording device $3_1$).

It should be understood that the illustrated example shown in FIG. 8 shows a highly simplified example representation of a mapping pointer arrangement, and that other more complex arrangements may be used in other instances. For example, in some implementations, recordings may be received from multiple upstream recording devices $3_1$, and as such the pointer information may also identify one or more respective upstream recording device, and potentially one or more alternative upstream recording devices, where the recorded media content or part thereof can be retrieved. In some implementations, recording is performed from multiple channels at once, and content of programs which are still being recorded is played back. In such cases, the mapping pointer configuration may be significantly more complicated.

Shown in FIG. 9 is example pointer information representing how the mapping pointers may appear in a hierarchical arrangement of recording devices, such as the one shown in FIG. 7, for example. In the illustrated example, recordings R1 to R5 may be requested by an end-user of one of the recording devices $3_0$ of FIG. 7. Further recordings R6 and R7 may also be available on the network, but may not have been requested by the particular end-user recording device $3_0$. Once the scheduled transmission times for R1 to R7 have passed, the various pointer tables may appear as illustrated in FIG. 9. Recording tables 22 and 23 are as in FIG. 8. Recording table 21', on the other hand, may indicate that the recording R2 requested by recording device $3_0$ is not recorded on the first (next) upstream recording device $3_1$ (Ups1). Since it is located in the network between an upstream device $3_2$ (not shown in FIG. 7) and (in this case two) downstream devices $3_0$, the recording device $3_1$ (Ups1) may be referred to as an intermediate recording server. Recording R3 was requested by recording device $3_0$, but was only partially available on Ups1 (recording device $3_1$). Also, recording R6, which was not requested by recording device $3_0$, is only partially recorded Ups1 recording device $3_1$.

Therefore, the mapping table 21' of recording device $3_1$ includes pointers p'3($t_1$) and p'6($t_2$) which point to the corresponding content portions on the further upstream recording device $3_2$ (Ups2). In this case, the Ups2 upstream recording device $3_2$ is in turn missing a portion of recording R6, so its recording table 24 in turn includes a pointer p'6($t_3$) to a device $3_3$ or $3_n$ (not illustrated) yet further upstream for this missing portion.

If a requested media content portion is not available on an upstream recording device when it is requested, a further content request may be made to the next upstream recording device. If the requested media content portion is available at that next upstream recording device, the requested content may be streamed directly to the end-user's device—thus, it does not need to pass through the hierarchy of intermediate devices. Alternatively, if enough requests are received for the content, the content can be transmitted downstream to the intermediate recording device or devices, from where it can be streamed to the multiple requesters, optionally in the form of a mini-multicast.

In an example implementation, in a network (arrangement) of recording devices according to the present disclosure, an intelligent combination of distributed network storage devices may be implemented, with each of devices having storage of different characteristics, such as memory capacity or speed of access, for example, with the aim of balancing or optimizing memory requirements and thereby minimizing overall network traffic.

In an example implementation, in a multicast transmission, the media content may be recorded as far down the network hierarchy from the source media content server as possible, in order to reduce the instances of repeated transmission of media content. Each recording or part-recording may be made (e.g., content recorded) at the lowest plausible level in the hierarchy, and without the need for any significant system-level management of the recording locations.

In playback mode, the recorded portions may either be available locally, or can be retrieved using locally available mapping pointer information, without the need for any significant system-level management of the recording portions.

Other implementations of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain implementations, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular implementation disclosed, but that the present disclosure will include all implementations falling within the scope of the appended claims.

What is claimed is:

1. A method comprising:
   receiving, by a recording device, a recording instruction identifying a media content transmitted by an upstream media content server;
   offloading recording one or more of a plurality of portions of the media content to one or more intermediate recording devices positioned between the recording device and the upstream media content server, wherein each of the plurality of portions corresponds to a different portion of a transmission period associated with transmission of the media content;
   assigning, to each of the plurality of portions, corresponding recording control information, wherein the recording control information is configured based, at least in part, on one or more parameters associated with a network node recording or storing a corresponding one of the plurality of portions;
   managing storage and retrieval of each of the plurality of portions of the media content based, at least in part, on the corresponding recording control information; and
   overwriting, by one or more of the recording device and the one or more intermediate recording devices, the media content or locally-stored portions thereof, based on the recording control information assigned to each of the plurality of portions.

2. The method according to claim 1, comprising directly recording, by the recording device, at least one of the plurality of portions of the media content.

3. The method according to claim 1, comprising offloading, by the recording device, recording all of the plurality of portions of the media content.

4. The method according to claim 1, comprising controlling one or more of the offloading, the assigning, and the managing of storage and retrieval based on a recording status parameter of at least one of the recording device and the one or more intermediate recording devices.

5. The method according to claim 4, comprising setting or adjusting the recording status parameter based on one or more of: a bandwidth availability for the transmission, a processing capacity, a recording storage availability, and a recording preference provided by an end-user or a network provider.

6. The method according to claim 1, comprising offloading, by one of the one or more intermediate recording devices, to another intermediate recording device, recording of at least one of the one or more of the plurality of portions of the media content.

7. The method according to claim 6, comprising identifying the at least one of the one or more of the plurality of portions based on identification information of at least a corresponding portion of the transmission period associated with transmission of the media content.

8. The method according to claim 6, comprising controlling the offloading of the recording of the at least one of the one or more of the plurality of portions based, at least in part, on a recording status parameter of the one of the one or more intermediate recording devices.

9. The method according to claim 1, further comprising offloading recording one or more of the plurality of portions of the media content to the one or more intermediate recording devices based on a predictive algorithm.

10. The method according to claim 1, comprising determining the recording control information assigned to each of the plurality of portions based on one or more of:
a duration parameter of the media content;
a recording storage preference provided by a network provider;
a playback probability parameter of the media content, the playback probability parameter being calculated in dependence on one or more historical playback patterns of previous media contents;
an elapsed time since the beginning of the transmission period of the media content; and
a popularity parameter of the media content.

11. A system, comprising:
a recording device configured to record media content transmitted by an upstream media content server, wherein the recording device comprises:
storage circuitry; and
a control circuit that is configured to:
receive a recording instruction identifying a media content transmitted by the upstream media content server;
offload recording one or more of a plurality of portions of the media content to one or more intermediate recording devices positioned between the recording device and the upstream media content server, wherein each of the plurality of portions corresponds to different portion of a transmission period associated with transmission of the media content;
assign, to each of the plurality of portions, corresponding recording control information, wherein the recording control information is configured based, at least in part, on one or more parameters associated with a network node recording or storing a corresponding one of the plurality of portions;
manage storage and retrieval of each of the plurality of portions of the media content based, at least in part, on the corresponding recording control information; and
overwrite the media content or locally-stored portions thereof based on the recording control information assigned to each of the plurality of portions.

12. The system according to claim 11, wherein the control circuit is configured to directly record, into the storage circuitry, at least one of the plurality of portions of the media content.

13. The system according to claim 11, wherein the control circuit is configured to offload recording all of the plurality of portions of the media content.

14. The system according to claim 11, wherein the control circuit is configured to control one or more of the offloading, the assigning, and the managing of storage and retrieval based on a recording status parameter of at least one of the recording device and the one or more intermediate recording devices.

15. The system according to claim 14, wherein the control circuit is configured to set or adjust the recording status parameter based on one or more of: a bandwidth availability for the transmission, a processing capacity, a recording storage availability, and a recording preference provided by an end-user or a network provider.

16. The system according to claim 11, wherein one of the one of the one or more intermediate recording devices offloads, to another intermediate recording device, recording of at least one of the one or more of the plurality of portions of the media content; and
wherein the control circuit is configured to identify the at least one of the one or more of the plurality of portions based on identification information of at least a corresponding portion of the transmission period associated with transmission of the media content.

17. The system according to claim 16, wherein the control circuit is configured to control the offloading of the recording of the at least one of the one or more of the plurality of portions based, at least in part, on a recording status parameter of the one of the one or more intermediate recording devices.

18. The system according to claim 11, wherein the control circuit is configured to offload recording the one or more portions of the media content to the one or more intermediate recording devices based on a predictive algorithm.

19. The system according to claim 11, wherein the control circuit is configured to determine the recording control information assigned to each of the plurality of portions based on one or more of:
a duration parameter of the media content;
a recording storage preference provided by a network provider;
a playback probability parameter of the media content, the playback probability parameter being calculated in dependence on one or more historical playback patterns of previous media contents;
an elapsed time since the beginning of the transmission period of the media content; and
a popularity parameter of the media content.

* * * * *